United States Patent [19]

Wenzel et al.

[11] Patent Number: 5,063,649
[45] Date of Patent: Nov. 12, 1991

[54] ROLL ASSEMBLY WITH ROTATABLE SHELL FOR USE IN CALENDERS AND LIKE MACHINES

[75] Inventors: Reinhard Wenzel; Richard Rauf, both of Krefeld, Fed. Rep. of Germany

[73] Assignee: Kleinewefers GmbH, Krefeld, Fed. Rep. of Germany

[21] Appl. No.: 645,596

[22] Filed: Jan. 24, 1991

[30] Foreign Application Priority Data

Jan. 27, 1990 [DE] Fed. Rep. of Germany ....... 4002387

[51] Int. Cl.⁵ .............................................. B21B 31/16
[52] U.S. Cl. ................................... 29/116.1; 29/116.2
[58] Field of Search ................. 29/113.1, 113.2, 116.1, 29/116.2; 100/162 R, 163 A, 170

[56] References Cited

U.S. PATENT DOCUMENTS

| | | | |
|---|---|---|---|
| 4,213,232 | 7/1980 | Biondetti et al. | 29/116.2 |
| 4,389,933 | 6/1983 | Pav | 100/162 B |
| 4,394,793 | 7/1983 | Pav | 29/116 AD |
| 4,399,747 | 8/1983 | Schiel et al. | 29/116.2 X |
| 4,498,383 | 2/1985 | Pav | 100/162 B |
| 4,676,117 | 6/1987 | Schiel | 29/116.2 X |
| 4,680,843 | 7/1987 | Junk | 29/116 R |
| 4,691,421 | 9/1987 | Schiel | 29/116.2 |
| 4,757,584 | 7/1988 | Pav et al. | 29/116.2 |
| 4,757,585 | 7/1988 | Niskanen | 29/116.2 |
| 4,829,842 | 5/1989 | Schiel | 29/116.2 X |
| 4,837,907 | 6/1989 | Roerig et al. | 29/116.2 X |
| 4,964,202 | 10/1990 | Pav et al. | 29/116.2 |
| 4,989,436 | 2/1991 | Setzer et al. | 29/116.2 X |

FOREIGN PATENT DOCUMENTS 3711856 10/1988 Fed. Rep. of Germany .
2171490 8/1986 United Kingdom ............... 29/116.2

Primary Examiner—Timothy V. Eley
Assistant Examiner—C. Richard Martin
Attorney, Agent, or Firm—Peter K. Kontler

[57] ABSTRACT

A roll assembly for use in calenders has a non-rotatable carrier which is surrounded by a rotatable and radially movable hollow cylindrical shell. At least one end of the shell is driven by a pair of gears one of which is mounted in an annular bearing member surrounding a portion of the carrier and the other of which is connected with the one end of the shell. The bearing member shares the radial movements of the shell relative to the carrier. To this end, the radial position of the shell is monitored by one or two sensors in the form of first cylinder and piston units, and the bearing member is adjustable by two second cylinder and piston units. The cylinder chamber of each first unit is connected in circuit with the cylinder chamber of a different second unit, and the ratio of cross-sectional areas of the pistons of the first units to the cross-sectional areas of pistons of the second units is selected in such a way that the radial displacement of the bearing member matches or approximates the radial displacement of the shell. This prevents the application of pronounced stresses to the gears. The fluid in the two circuits is maintained above atmospheric pressure.

24 Claims, 3 Drawing Sheets

ROLL ASSEMBLY WITH ROTATABLE SHELL FOR USE IN CALENDERS AND LIKE MACHINES

BACKGROUND OF THE INVENTION

The invention relates to roll assemblies for use in calenders, rolling mills and like machines. More particularly, the invention relates to improvements in roll assemblies of the type disclosed in commonly owned U.S. Pat. No. 4,680,843 granted Jul. 21, 1987 to Dieter Junk et al.

The roll assembly of Junk et al. has a stationary carrier which is surrounded by a hollow cylindrical shell. The shell is movable radially relative to the carrier and is driven by a set of gears including a driver gear in a support or housing and a driven gear on the shell. The support is movable relative to the carrier radially of the shell in order to ensure that the two gears remain in mesh while the position of the shell with reference to the carrier changes. To this end, the position of the shell is monitored by a sensor which transmits signals to an adjusting device for the support. The adjusting device employs a hydrostatic cylinder and piston unit. The patented roll assembly can be used in connection with the treatment of paper, textiles, plastics, metallic sheets and the like. In addition, the patented roll assembly can be used in transporting systems for webs or sheets of flexible material.

Published German patent application No. 37 11 856 of Link et al. proposes to employ a counterweight which is connected to the support at one end of the roll shell by a cable to compensate for the weight of the support and for the weight of parts which are carried thereby.

OBJECTS OF THE INVENTION

An object of the invention is to provide a roll assembly which can stand pronounced stresses and can transmit large forces in calenders, mills and like machines.

Another object of the invention is to provide the roll assembly with novel and improved means for changing the position of the support which carries the driving element or elements for the shell in response to changes of the position of the shell relative to its carrier.

A further object of the invention is to provide a novel and improved system of sensors for use in the above outlined roll assembly.

An additional object of the invention is to provide the roll assembly with novel and improved means for preventing damage to the drive for the shell.

Still another object of the invention is to provide a roll assembly which is constructed and assembled in such a way that the position of the support is properly related to the position of the shell relative to the carrier irrespective of the magnitude of stresses which are applied to the shell and irrespective of the extent of radial displacement of the shell relative to the carrier.

SUMMARY OF THE INVENTION

The invention is embodied in a roll assembly which can be used in calenders and like machines. The improved roll assembly comprises an elongated carrier, a cylindrical shell which spacedly surrounds and is movable radially relative to the carrier, a support which is movable relative to the carrier substantially radially of the shell, and means for rotating the shell. The rotating means includes a rotary torque transmitting element which is carried by the support and a rotary torque receiving element which is carried by the shell and is driven by the torque transmitting element. The roll assembly further comprises means for monitoring the position of the shell relative to the carrier, and such monitoring means includes at least one first cylinder and piston unit having a first piston which is movable with the shell. Still further, the roll assembly comprises means for adjusting the support relative to the carrier, and the adjusting means comprises at least one second cylinder and piston unit having a second piston and a fluid-containing circuit which connects the at least one first cylinder and piston unit with the at least one second cylinder and piston unit. The first and second pistons have first and second cross-sectional areas, respectively, and the ratio of cross-sectional areas of the first and second pistons is selected in such a way that each radial movement of the shell relative to the carrier entails a similar or equal radial movement of the support relative to the carrier.

The roll assembly further comprises means for non-rotatably supporting the carrier and a bearing which rotatably mounts the shell on the carrier. The torque transmitting element preferably comprises a first gear (e.g., a pinion which is or can be driven by a variable-speed motor), and the torque receiving element then comprises a second gear (e.g., a ring-shaped spur gear) which mates with the first gear.

Each of the cylinder and piston units further comprises a cylinder, and the circuit includes at least one conduit which connects the cylinders with each other.

The axes of the pistons can be disposed in a common plane, and the cross-sectional area of the first piston can match the cross-sectional area of the second piston. The axes of the pistons are or can be disposed radially of the shell.

In accordance with a presently preferred embodiment, the axis of the first piston is disposed radially of the shell in a predetermined plane which extends at right angles to the axis of the shell, and the adjusting means comprises two second cylinder and piston units. The pistons of the second cylinder and piston units are disposed at opposite sides of the predetermined plane and their axes are parallel to the axis of the first piston. The pistons of the second cylinder and piston units can be mirror images of each other with reference to the predetermined plane, and the cross-sectional area of the first piston is twice the cross-sectional area of each of the two second pistons.

The assembly further comprises a radial bearing (e.g., an antifriction ball or roller bearing) in one end portion of the shell and a sleeve which is surrounded by the bearing and non-rotatably but radially movably surrounds a portion of the carrier. The sleeve has an internal surface which is adjacent the first piston, and the at least one first cylinder and piston unit has a cylinder which receives the first piston and is provided in the carrier. The first piston can be rigid (e.g., integral) with the sleeve.

The monitoring means can comprise two first cylinder and piston units which are disposed substantially diametrically opposite each other with reference to the axis of the shell. The adjusting means then preferably comprises a second cylinder and piston unit for each first cylinder and piston unit and a discrete fluid-containing circuit for each second unit. Each of these circuits connects one of the second units with one of the first units. The second cylinder and piston units can be disposed substantially diametrically opposite each other with reference to the axis of the shell. Such second cylinder and piston units can jointly constitute a double-acting cylinder and piston unit with a double-acting piston which is constituted by the second pistons and a single piston rod which extends axially beyond both axial ends of the double-acting piston.

The adjusting means can comprise means for maintaining the pressure of fluid (e.g., oil) in the circuit or circuits above atmospheric pressure. Such pressure maintaining means can comprise a source of pressurized fluid (e.g., a pump), a pressure regulating device (e.g., a suitable valve) which is connected with the source, and a check valve which is connected between the pressure regulating device and the circuit to permit admission of pressurized fluid from the source into the circuit by way of the pressure regulating device.

If the monitoring means comprises two first cylinder and piston units and the adjusting means comprises a second cylinder and piston unit for each first unit as well as a discrete circuit for each second unit, the means for maintaining the pressure of fluid in the circuits above atmospheric pressure can comprise a single source of pressurized fluid, a single pressure regulating device which is connected with the single source (or a discrete pressure regulating device for each circuit), and a discrete check valve connected between the single pressure regulating device or the respective pressure regulating device and each of the circuits to permit admission of pressurized fluid from the source into the respective circuit but to prevent escape of fluid from the respective circuit by way of the check valve.

The roll assembly can further comprise means for compensating for the weight of the support and of the parts which are carried by the support (such as the aforementioned torque transmitting element). The weight compensating means can comprise at least one additional cylinder and piston unit. The support can include or constitute an annular member which surrounds a portion of the carrier at one axial end of the shell and has an internal surface. The additional cylinder and piston unit can include a third piston which acts upon the internal surface of the annular member. The cylinder of such additional cylinder and piston unit (i.e., the cylinder for the third piston) can be provided in or on the carrier. The compensating means preferably further comprises a source of pressurized fluid and a pressure regulating device which connects the source with the cylinder for the third piston. The compensating means can also comprise an accumulator which stores pressurized fluid and is connected with the cylinder for the third piston.

The shell is preferably deformable and the roll assembly can further comprise means for deforming the shell. Such deforming means can comprise a further cylinder and piston unit having a further piston which is coaxial and rigid with the first piston. The first unit has a first cylinder for the first piston, and the further unit has a further cylinder for the further piston. The diameter of the first piston is or can be different from the diameter of the coaxial further piston, and the circuit communicates with the first cylinder. The deforming means can further comprise means for supplying to the further cylinder oil or another pressurized fluid at a variable pressure in order to effect controlled deformation of the shell.

The second cylinder and piston unit comprises a cylinder which receives the second piston and communicates with the fluid-containing circuit. The third piston (of the weight compensating means) can be rigid and coaxial with the second piston, and the cylinder and piston unit of the weight compensating means further comprises a cylinder for the third piston. The source of pressurized fluid which forms part of the weight compensating means is connected with the cylinder for the third piston by a pressure regulating valve or an analogous pressure regulating device, and the second and third pistons can constitute a differential piston, i.e., a piston including a first portion having a first diameter and constituting the second piston and a second portion having a different second diameter and constituting the third piston.

The novel features which are considered as characteristic of the invention are set forth in particular in the appended claims. The improved roll assembly itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
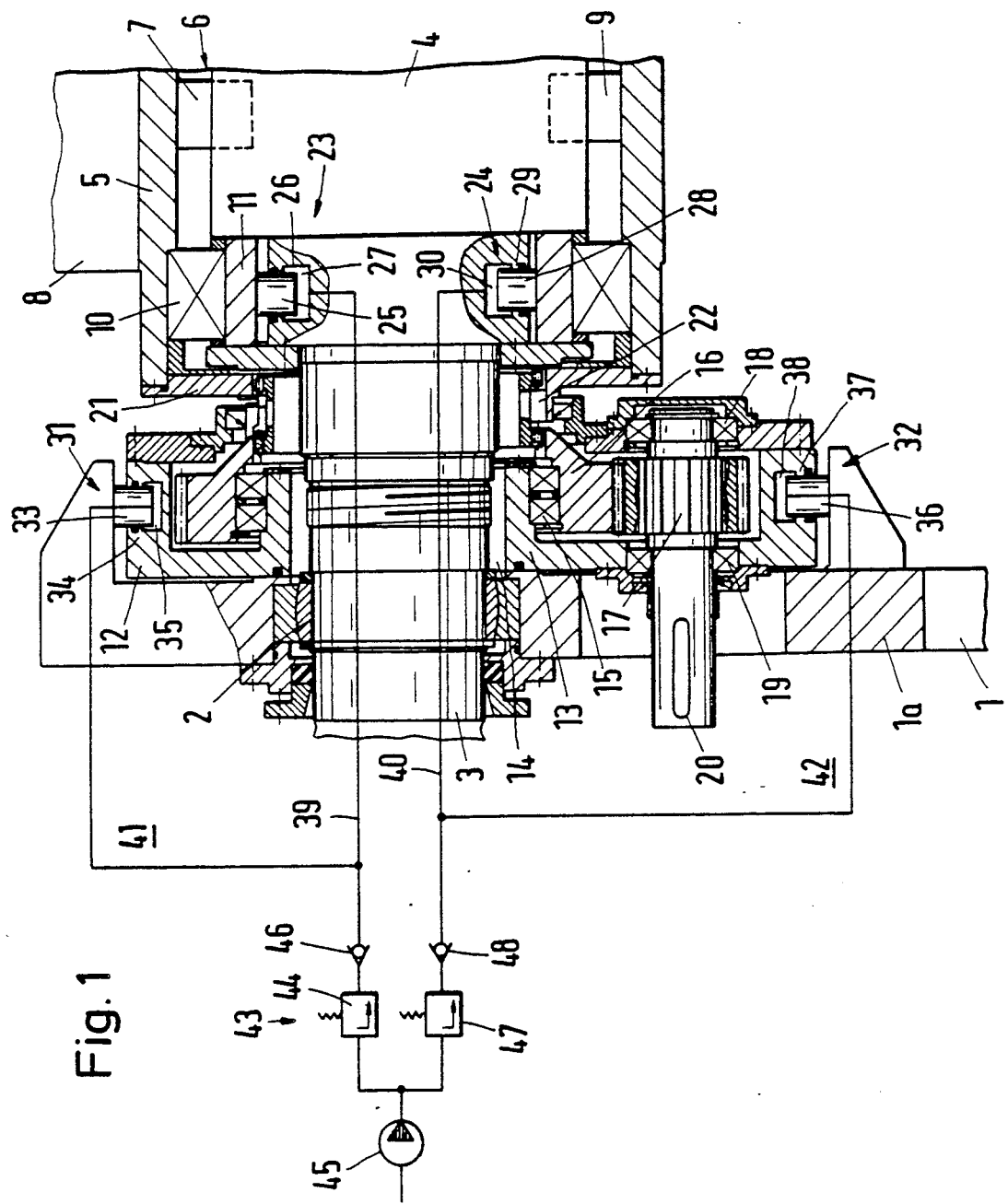
FIG. 1 is a fragmentary partly schematic and partly axial sectional view of a roll assembly which embodies one form of the invention.

FIG. 1 shows a portion of a roll assembly having a hollow cylindrical shell 5 which cooperates with an adjacent roll 8 to define a nip for a running web of paper, textile, plastic material, metallic sheet material or the like. Roll assemblies of the type shown in FIG. 1 can be used with advantage in calenders and analogous machines as well as in systems which merely transport flexible webs of paper or the like.

The shell 5 surrounds (with radial play) an elongated carrier 4 having two end portions 3 (only one can be seen in FIG. 1) in the form of cylindrical stubs which are mounted in spherical bearings 2 of a stationary frame 1. The carrier 4 does not rotate in the frame 1. A hydrostatic bearing or supporting unit 6 is provided between the internal surface of the shell 5 and the carrier 4 to maintain the shell in a selected radial position. This shell is movable substantially radially of the roll 8, i.e., up and down as seen in FIG. 1. The supporting unit 6 comprises a plurality of hydrostatic bearing elements 7 (only one shown) which form a row extending in parallelism with the axis of the shell 5 and reacting against the carrier 4 to maintain the adjacent portions of the shell in selected radial positions. The shell 5 is deformable and the hydraulic system (not shown) which supplies pressurized fluid to the cylinders of the bearing elements 7 can be operated to ensure that the shell is deformed in a particular way, e.g., to maintain the width of the nip of the shell 5 and roll 8 at a constant value. Reference may be had to commonly owned U.S.

Pats. Nos. 4,498,383 and 4,389,933 which describe and show several systems adapted to operate hydrostatic bearing elements for the purpose of selectively deforming the shell of a roll assembly in a calender or the like.

FIG. 1 further shows an additional bearing element 9 which is disposed diametrically opposite the illustrated bearing element 7. The element 9 preferably constitutes one of a row of such bearing elements which act to maintain the internal surface of the shell 5 in engagement with the adjacent outer portions of the bearing elements 7. The difference between the pressures in the cylinder chambers of the bearing elements 7 and 9 determines the magnitude of force which the shell 5 applies to a running web (not shown) in the nip of the roll 8 and shell 5.

The illustrated end portion of the shell 5 surrounds an antifriction ball or roller bearing 10 which, in turn, surrounds a sleeve 11. The sleeve 11 cannot rotate relative to but is movable radially of the roll 8, the same as the shell 5. The manner in which the sleeve 11 is held against rotation about the carrier 4 is known and, therefore, is not shown in the drawing.

The frame 1 supports or includes a casing 1a which, in turn, carries a housing 12 serving as a support for a rotary torque transmitting element 17 in the form of a gear meshing with a torque receiving element 16 which rotates the shell 5. The element 16 is a ring-shaped spur gear which is non-rotatably connected to the adjacent end portion of the shell 5 by a toothed coupling 22, e.g., a coupling of the type disclosed by Junk et al.

The support 12 is movable radially of the roll 8 in the same directions as the shell 5 and sleeve 11. The inner diameter of this support (which is an annular member) is selected in such a way that the space 14 within the internal surface of the support receives, with requisite clearance, the corresponding portion of the stub 3. The space 14 is surrounded by an annular inner portion 13 of the support 12. The driven gear 16 (which rotates the shell 5 by way of the coupling 22) extends into the support 12 and is rotatable on antifriction ball or roller bearings 15 which surround the annular portion 13. The driver gear 17 is a pinion which mates with the gear 16 and is rotatable in antifriction bearings 18, 19 of the support 12. The shaft 20 of the gear 17 receives torque from a suitable prime mover, e.g., from a variable-speed electric motor (not shown). The coupling 22 transmits torque between the gear 16 and an internal radial flange 21 which is non-rotatably inserted into the adjacent end portion of the shell 5 axially outwardly of the bearing 10 and sleeve 11. The coupling 22 is designed to prevent the transmission of bending or flexing stresses but to rotate the shell 5 in response to rotation of the gear 16. Such couplings are available on the market in many forms (for example, the coupling can be of the type known as BoWex (Trademark) distributed by KTR Corporation, Michigan City, IN. The purpose of the coupling 22 is to ensure that the shell 5 can be rotated by the gears 16, 17 even if it is not exactly coaxial with the gear 16. As a rule, the eccentricity of the shell 5 relative to the gear 16 and/or vice versa should remain within a certain rather narrow range.

The radial movements of the shell 5 relative to the roll 8 (and hence relative to the carrier 4) are monitored by two sensors 23, 24 each of which includes or constitutes a hydrostatic cylinder and piston unit. The sensor 23 comprises a piston 25 which is adjacent the internal surface of the sleeve 11 and can be rigid (e.g., integral) with the sleeve. The piston 25 is reciprocable in the chamber 27 of a cylinder 26 which is provided in the carrier 4. The sensor 24 is disposed diametrically opposite the sensor 23 (with reference to the axis of the shell 5) and includes a piston 28 which is affixed to and is adjacent the internal surface of the sleeve 11. The piston 28 is reciprocable in the chamber 30 of a cylinder 29 which is provided in the carrier 4 opposite the cylinder 26.

The means for adjusting the support 12 with reference to the carrier 4 in response to radial movements of the shell 5 comprises two hydrostatic cylinder and piston units 31, 32 which are disposed diametrically opposite each other with reference to the axis of the shell 5. The axes of the pistons 33, 36 of the units 31, 32 are coplanar with the axes of the pistons 25, 28 and with the axis of the shell 5. The piston 33 of the unit 31 is affixed to the frame 1 and extends into the chamber 35 of a cylinder 34. The piston 36 of the unit 32 is also rigid with the frame 1 and extends into the chamber 38 of a cylinder 37. The pistons 33, 36 of the adjusting units 31, 32 serve the additional purpose of confining the support 12 to reciprocatory movements radially of the shell 5, i.e., these pistons prevent the support from changing its orientation relative to the carrier 4.

A conduit 39 (a portion of this conduit can constitute a bore in the carrier 4 and in its stub 3) forms part of a first fluid-containing circuit 41 which establishes communication between the cylinder chamber 27 of the sensor 23 and the cylinder chamber 35 of the unit 31. A second conduit 40 forms part of a second fluid-containing circuit 42 which establishes communication between the cylinder chamber 30 of the sensor 24 and the cylinder chamber 38 of the unit 32. The diameters (and hence the effective cross-sectional areas) of the pistons 33, 36 respectively match the diameters of the pistons 25, 28, and the diameter of the piston 25 can match the diameter of the piston 28.

In addition to the units 31, 32 and circuits 41, 42, the means for adjusting the support 12 radially of the roll 8 comprises a system 43 which maintains the pressure in the fluid-containing circuits 41, 42 above atmospheric pressure in order to immediately compensate for leakage (if any) of the confined fluid, such as oil. The system 43 comprises a pump 45 or another suitable source of pressurized fluid, a first pressure regulating valve 44 which is installed in the conduit 39 between the outlet of the pump 45 and the circuit 41, a second pressure regulating valve 47 which is installed in the conduit 40 between the outlet of the pump 45 and the circuit 42, a first check valve 46 which permits pressurized fluid to flow from the pump 45 into the circuit 41, and a second check valve 48 which permits pressurized fluid to flow from the pump into the circuit 42. The system 43 ensures that the radially inner end faces of the pistons 25, 28 are acted upon by pressurized fluid and that the radially inner end faces of the pistons 33, 36 are also acted upon by pressurized fluid. In other words, the sleeve 11 and the support 12 are stressed to remain in selected radial positions relative to the roll 8.

When the shell 5 is caused to change its position radially of the roll 8 in response to the action of hydrostatic bearing elements 7 and/or 9, the support 12 automatically follows such radial displacement of the shell toward or away from the roll 8. For example, if the shell 5 is caused to move upwardly (as seen in FIG. 1), the volume of the cylinder chamber 30 is reduced as a result of upward movement of the piston 28 with the shell 5, and the circuit 42 enables the expelled fluid to flow into the cylinder chamber 38. This causes the support 12 to rise and to lift the cylinder chamber 35 relative to the piston 33. This, in turn, results in expulsion of a certain quantity of pressurized fluid from the cylinder chamber 35, and the circuit 41 permits the expelled fluid to flow into the cylinder chamber 27 of the sensor 23.

The adjustment of the pressure regulating valves 44 and 47 can be such that the sensors 23, 24 exert a deforming force upon the adjacent end portion of the shell 5. Thus, the sensors 23, 24 can perform the additional function of cooperating with the bearing elements 7 and/or 9 to select the extent of deformation of the shell 5 in order to determine the magnitude of force which the shell applies to a running web and/or to determine the width of the nip of this shell and the roll 8.

The structure at the other end of the shell 5 and carrier 4 can be a mirror image of the structure which is shown in FIG. 1.

Each bearing element 7 and/or 9 can comprise a plurality of cylinder and piston units. Reference may be had, for example, to commonly owned U.S. Pat. No. 4,394,793 to Pav et al.

An advantage of the improved roll assembly is that each shifting of the shell 5 radially of the roll 8 automatically entails a corresponding displacement of the support 12 and hence of the gears 16 and 17 so that the coupling 22 is invariably in a condition to transmit torque from the gear 16 to the shell 5. Such follow-up movements of the support 12 in response to shifting of the shell 5 are ensured by the circuits 41 and 42 which render it possible to dispense with a complex automatic control system. The sensitivity of a control system increases with its accuracy. The cylinder and piston units which constitute the sensors 23, 24 exhibit pronounced stability and are capable of transmitting large forces. The likelihood of damage to and malfunctioning of the sensors 23, 24 is practically nil. The same applies for the hydrostatic cylinder and piston units 31, 32 and for the circuits 41, 42. Moreover, the system 43 automatically compensates for losses due to leakage of the confined fluid. The above outlined advantages render it possible to employ the improved roll assembly with particular advantage in rolling plants and other establishments where a roll assembly using a carrier and a hollow cylindrical shell is expected to take up and to transmit large forces. The coupling 22 is subjected to negligible stresses so that it can stand long periods of use; this is due to the reliability of the operative connection between the sensors 23, 24 and the means (including 31, 32, 41, 42 and 43) for adjusting the position of the support 12 in response to shifting of the shell 5 as well as to the sturdiness of the sensors 23, 24 and hydrostatic cylinder and piston units 31, 32. The magnitude of stresses which the support 12 can transmit to the shell 5 is limited which is desirable and advantageous because the position and extent of deformation of the shell can be selected and maintained with a higher degree of accuracy and reproducibility.

An advantage of illustrated selection of the positions of the sensors 23, 24 within the sleeve 11 is that the pistons 25, 28 of these sensors invariably share all radial movements of the shell 5 but need not rotate with the shell. This is due to the fact that the bearing 10 enables the shell 5 to rotate about the sleeve 11 even though the sleeve moves with the shell 5 when the latter is displaced radially of the roll 8. Since the pistons 25, 28 are affixed to (e.g., integral with) the sleeve 11, and since these pistons extend into cylinders (26, 29) which are provided in the carrier 4, the sensors 23, 24 perform the additional function of holding the sleeve 11 against angular movement relative to the carrier (i.e., against angular movement with the shell 5).

Though it is equally within the purview of the invention to employ a single sensor (23 or 24) and to utilize adjusting means employing a single cylinder and piston unit (31 or 32), the construction which is shown in FIG. 1 and employs two sensors 23, 24 as well as two cylinder and piston units 31, 32 is preferred at this time because this renders it possible to rely on pressurized fluid for movements of the support 12 toward as well as away from the roll 8. Such design is particularly advantageous when the axes of the roll 8 and shell 5 are located in a horizontal or nearly horizontal plane but the reliability of the roll assembly is also increased if the movements of the support 12 do not have a horizontal component, i.e., if the axes of the roll 8 and shell 5 are located in a vertical plane as actually shown in FIG. 1.

Though not absolutely necessary, it is desirable and advantageous to dispose the sensors 23, 24 as well as the cylinder and piston units 31, 32 diametrically opposite each other with reference to the axis of the shell 5. Such symmetrical distribution of the sensors 23, 24 and of cylinder and piston units 31, 32 in the means for adjusting the support 12 contributes to reliability of the monitoring and adjusting actions.

Figure 2:
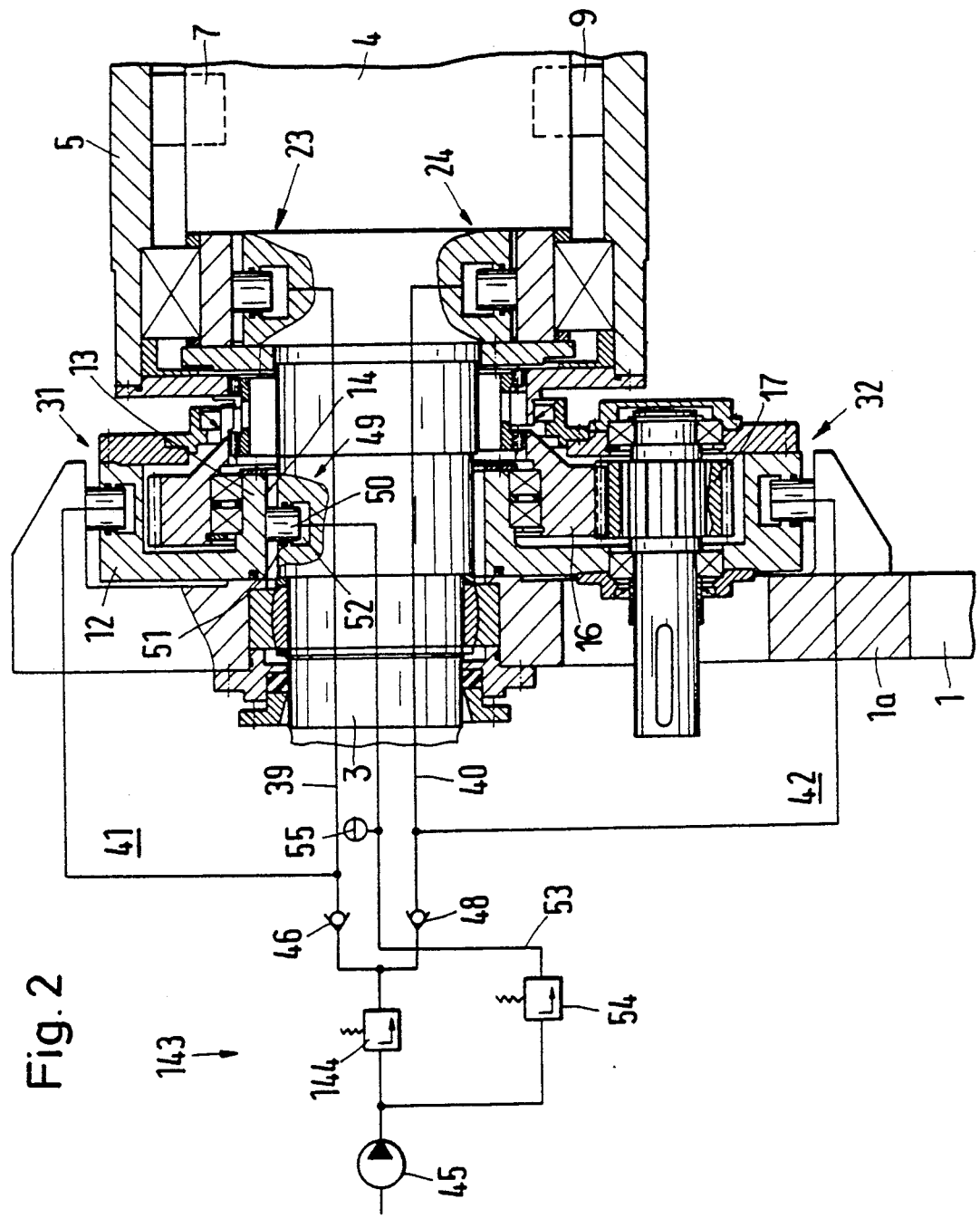
FIG. 2 is a similar fragmentary partly schematic and partly axial sectional view of a second roll assembly.

The roll assembly of FIG. 2 is similar to that of FIG. 1 and all such parts which are identical with those of the first roll assembly are denoted by similar reference characters. One of two differences between the two roll assemblies is that the means for adjusting the support 12 in the embodiment of FIG. 2 includes a system 143 with a single pressure regulating valve 144 (in lieu of the valves 44 and 47). The valve 144 is connected between the output of the pump 45 and the check valves 46, 48 in the conduits 39 and 40, respectively.

A second difference between the roll assemblies of FIGS. 1 and 2 is that the embodiment of FIG. 2 further comprises an additional cylinder and piston unit 49 which compensates for the weight of the support 12 and of all such parts (including the gears 16 and 17) which are carried by the support. The piston 50 of the weight compensating unit 49 is affixed to and extends radially inwardly into the space 14 from the internal surface of annular portion 13 of the support 12. The chamber 52 of the cylinder 51 for the piston 50 is provided in the stub 3 of the carrier 4. The means for supplying pressurized fluid (e.g., oil) to the cylinder chamber 52 comprises the pump 45 and an adjustable pressure regulating valve 54 which is installed in a conduit 53 connecting the outlet of the pump 45 with the cylinder 51. The conduit 53 can further receive pressurized fluid from an accumulator 55 which is installed between the unit 49 and the adjustable valve 54. The purpose of the accumulator 55 is to damp the follow-up movements of the support 12. The adjustment of the valve 54 is such that the pressure in the cylinder chamber 52 compensates for the weight of the support 12 and of all parts which are carried thereby. Thus, the movements of the shell 5 radially of the roll 8 (not shown in FIG. 2) are not affected by the weight of the support 12, gear 16 and/or gear 17.

An advantage of the system 143 is that it dispenses with discrete pressure regulating valves for the circuits 41, 42. In addition, the system 143 ensures that fluid pressure in the circuit 41 matches the pressure of fluid in the circuit 42. Therefore, the units 31 and 32 subject the support 12 to symmetrically distributed stresses.

The weight compensating unit 49 ensures that the support 12 cannot subject the shell 5 to any stresses, and this contributes to accuracy of adjustment of the radial position of the shell by way of the supporting means including the hydrostatic bearing elements 7 and 9.

Though it is possible to install the unit 49 outside of the support 12, the illustrated location of this unit in the space 14 within the annular portion 13 of the support is preferred in many instances because this contributes to compactness of the roll assembly and ensures that the unit 49 is shielded from undesirable influences.

Figure 3:
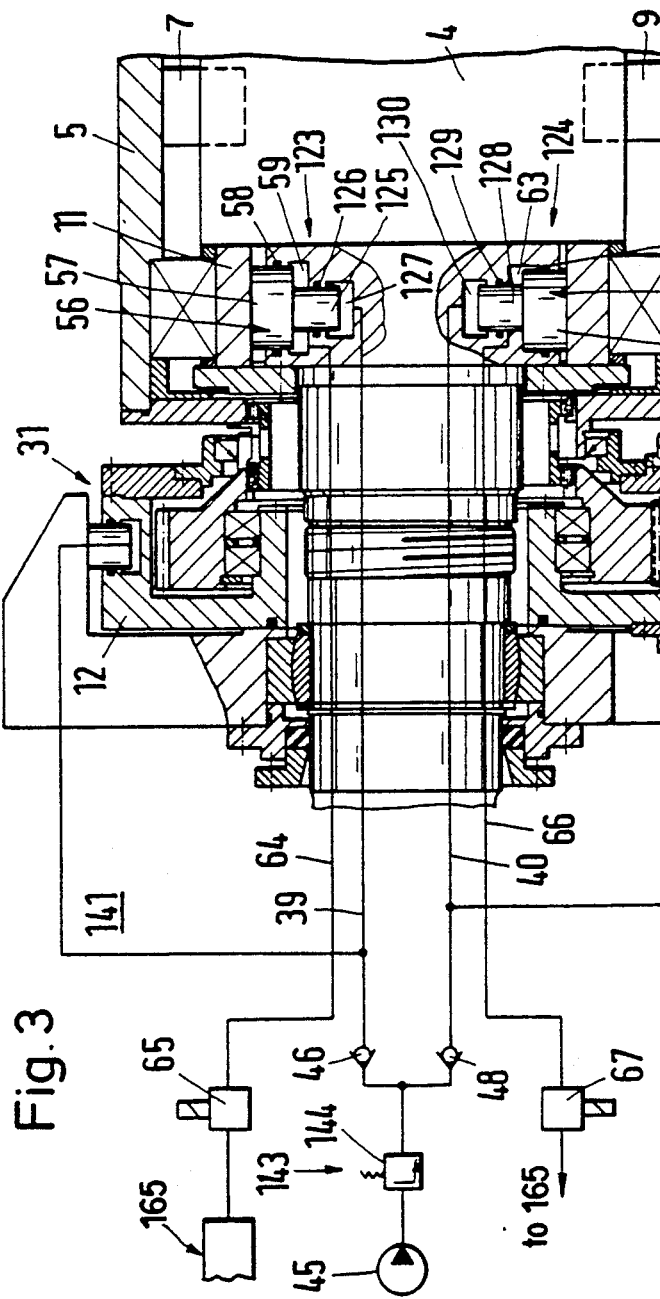
FIG. 3 is a similar fragmentary partly schematic and partly axial sectional view of a third roll assembly.

The roll assembly of FIG. 3 constitutes a modification of the roll assembly which is shown in FIG. 2. Thus, the system 143 which forms part of means for adjusting the support 12 comprises a single adjustable pressure regulating valve 144, and the weight of the support 12 and of the parts carried by the support is compensated for by a (modified) hydrostatic cylinder and piston unit 149.

The sensor 123 is combined with a further hydrostatic cylinder and piston unit 56 forming a first part of means for deforming (when necessary) the illustrated end portion of the shell 5. The sensor 124 is combined with a hydrostatic cylinder and piston unit 60 forming a second part of the means for deforming the illustrated end portion of the shell 5. A third part of the deforming means serves to vary the pressure in the chambers 59, 63 of cylinders 58, 62 for the pistons 57, 61 of the units 56, 60, respectively. The piston 57 constitutes the larger-diameter portion of a differential or step piston which further includes a smaller-diameter portion 125 constituting the piston in the chamber 127 of the cylinder 126 forming part of the sensor 123. Analogously, the piston 61 of the unit 60 constitutes the larger-diameter portion of a differential piston having a smaller-diameter portion 128 which is the piston in the chamber 130 forming part of the cylinder 129 in the sensor 124.

The differential pistons 57, 125 and 61, 128 are affixed to the sleeve 11 so that they share all radial movements of the shell 5. The annular cylinder chamber 59 is connected with a conduit 64 which contains a pressure regulating valve 65 (e.g., a solenoid-operated valve) serving to control the flow of pressurized fluid to the unit 56 in response to signals from a control unit 165. The annular cylinder chamber 63 is connected with a conduit 66 containing a pressure regulating valve 67. The latter is adjustable in response to signals from the control unit 165, the same as the valve 65. The control unit 165 further serves to select the pressure for the hydrostatic bearing elements 7 and 9. These bearing elements cooperate with the units 56 and 60 to select the configuration of the shell 5 along the nip of this shell with the roll 8 (not shown in FIG. 3) all the way from the one to the other axial end of the shell. As mentioned above, and as can be seen in FIG. 3, the units 56, 60 are constructed and assembled to deform (when necessary) the illustrated end portion of the shell 5.

Another feature of the roll assembly of FIG. 3 is that the aforementioned weight compensating hydrostatic cylinder and piston unit 149 is combined with the cylinder and piston unit 132 of the means for adjusting the support 12 relative to the carrier 4 radially of the roll 8. Thus, the piston 136 in the chamber 138 of the cylinder 137 forming part of the unit 132 constitutes the smaller-diameter portion of a differential piston 68, the larger-diameter portion of which constitutes the piston 150 in the chamber 152 of the cylinder 151 forming part of the unit 149. The circuits 141, 142 are identical with the circuits 41, 42 in the roll assembly of FIG. 2.

An advantage of the deforming means including the units 56 and 60 is that these units do not contribute to the space requirements of the roll assembly. In addition, the units 56 and 60 can deform the end portion of the shell 5, i.e., that end portion which surrounds the shell 11. The latter shields the units 56, 60, the same as the sensors 123 and 124.

The manner (see the parts 45, 53-55 in the lower portion of FIG. 3) in which the chamber 152 of the cylinder 151 for the piston 150 of the weight compensating unit 149 receives fluid at a pressure which suffices to compensate for the weight of the support 12 and of the parts carried thereby is the same as described in connection with FIG. 2. The only difference is that the unit 149 is not confined within the support 12 and that this unit is combined with the unit 132.

Figure 4:
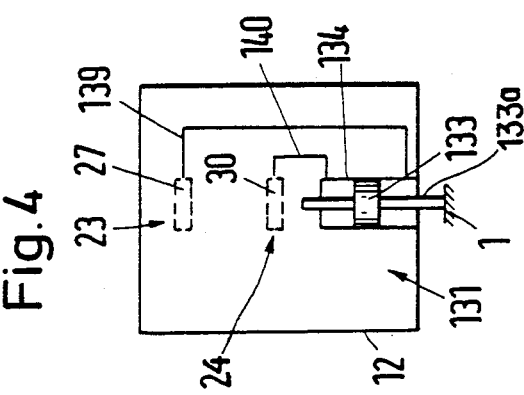
FIG. 4 is an end elevational view of an annular support and of modified adjusting means therefor.

FIG. 4 is a front elevational view of the support 12 and shows, by broken lines, the cylinder chambers 27, 30 of the sensors 23, 24 which can be identical with those shown in FIG. 1 or 2. The hydrostatic cylinder and piston units 31, 32 of FIG. 1 or 2 are replaced with a single hydrostatic cylinder and piston unit 131 having a double-acting piston 133 and a piston rod 133a extending beyond both axial ends of the piston 133. The cylinder 134 for the piston 133 has two discrete chambers, one at each end of the piston. The cylinder 134 is provided in the support 12, and the piston 133 is connected with the frame 1. A conduit 139 connects the cylinder chamber 27 of the sensor 23 with the lower chamber of the cylinder 134, and the upper chamber of this cylinder is connected to the cylinder chamber 30 of the sensor 24 by a conduit 140. The operation of the roll assembly employing the support 12, the sensors 23, 24 and the double-acting cylinder and piston unit 131 of FIG. 4 is analogous to that of the roll assembly of FIG. 1 or 2.

An advantage of a roll assembly which embodies the structure of FIG. 4 is its compactness, i.e., a single cylinder and piston unit 131 suffices to positively move the support 12 toward or away from the roll 8.

Figure 5:
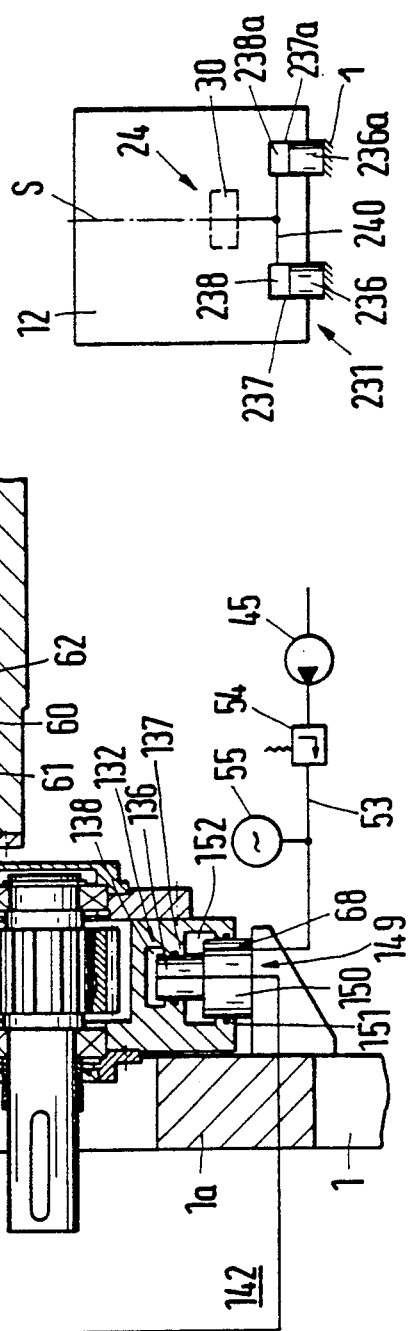
FIG. 5 is an end elevational view of an annular support and of further adjusting means therefor.

FIG. 5 shows the support 12 in a front elevational view. The axis of the piston in the cylinder chamber 30 of the sensor 24 is located in a plane S. A conduit 240 connects the chamber 30 with the chambers 238, 238a of cylinders 237, 237a for two discrete pistons 236, 236a forming part of a twin or dual cylinder and piston unit 231 which is used to adjust the support 12 relative to the frame 1. The cylinders 237, 237a are provided in the support 12 and are mirror images of each other with reference to the symmetry plane S. The cross-sectional area of each of the pistons 236, 236a is half the cross-sectional area of the piston in the cylinder chamber 30 of the sensor 24. The symmetry plane S includes the axis of the shell 5 and of the roll 8, and the axes of the pistons 236, 236a are parallel to the axis of the piston in the cylinder chamber 30.

An advantage of the structure of FIG. 5 is that the adjustments of the support 12 are even more reliable because the pistons 236, 236a transmit to the support identical forces at both sides of the symmetry plane and at the same distance from such plane. The small-diameter pistons 236, 236a thus ensure desirable synchronization of movements of all parts of the support 12 in the same direction.

The improved roll assembly is susceptible of many additional modifications without departing from the spirit of the invention. For example, and as already mentioned above, the axes of the shell 5 and roll 8 need not be located in a vertical plane. The improved sensor or sensors for the shell 5 and the adjusting means for the support 12 can be used with equal advantage if the axis of the shell is reciprocable in a horizontal plane or in a plane which is inclined to the vertical as well as to the horizontal.

Furthermore, the means for compensating for the weight of the support 12 and of the parts which are mounted on the support can comprise a plurality of (e.g., two) cylinder and piston units 49 or 149. If the weight compensating means comprises two cylinder and piston units, they are preferably located diametrically opposite each other with reference to the axis of the shell 5, and the weight compensating action is then furnished by the force constituting the difference between the forces which are applied by the two cylinder and piston units.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A roll assembly for use in calenders or similar machines, comprising an elongated carrier; a cylindrical shell spacedly surrounding and movable radially relative to said carrier; a support movable relative to said carrier substantially radially of said shell; means for rotating said shell including a rotary torque transmitting element carried by said support and a rotary torque receiving element carried by said shell and driven by said torque transmitting element; means for monitoring the position of said shell relative to said carrier, including at least one first cylinder and piston unit having a first piston movable with said shell; and means for adjusting said support relative to said carrier, including at least one second cylinder and piston unit having a second piston, and a fluid-containing circuit connecting said units, said pistons having first and second cross-sectional areas, respectively, and the ratio of said cross-sectional areas being such that each radial movement of said shell relative to said carrier entails a substantially equal radial movement of said support relative to said carrier.

2. The assembly of claim 1, further comprising means for non-rotatably supporting said carrier and a bearing rotatably mounting said shell on said carrier, said torque transmitting element comprising a first gear and said torque receiving element comprising a second gear mating with said first gear.

3. The assembly of claim 1, wherein each of said units comprises a cylinder for the respective piston and said circuit includes at least one conduit which connects said cylinders to each other.

4. The assembly of claim 3, wherein said pistons have axes which are disposed in a common plane.

5. The assembly of claim 3, wherein the cross-sectional area of said first piston matches the cross-sectional area of said second piston.

6. The assembly of claim 3, wherein said pistons have axes which are disposed radially of said shell.

7. The assembly of claim 3, wherein said first piston has an axis which is disposed radially of said shell in a predetermined plane extending transversely of the axis of said shell, said adjusting means including two second cylinder and piston units and the pistons of said second units being disposed at opposite sides of said plane and having axes parallel to the axis of said first piston.

8. The assembly of claim 7, wherein the pistons of said second units are mirror images of each other with respect to said plane and the cross-sectional area of said first piston is twice the cross-sectional area of each of said second pistons.

9. The assembly of claim 1, wherein said shell includes first and second end portions and further comprising a radial bearing in one of said end portions and a sleeve surrounded by said bearing and non-rotatably but radially movably surrounding said carrier, said sleeve having an internal surface adjacent said first piston, said at least one first cylinder and piston unit further having a cylinder receiving said first piston and provided in said carrier.

10. The assembly of claim 9, wherein said first piston is rigid with said sleeve.

11. The assembly of claim 1, wherein said monitoring means comprises two first cylinder and piston units which are disposed substantially diametrically opposite each other with reference to the axis of said shell, said adjusting means comprising a second cylinder and piston unit for each of said first units and a discrete fluid-containing circuit for each of said second units, each of said circuits connecting one of said second units with one of said first units.

12. The assembly of claim 11, wherein said second cylinder and piston units are disposed substantially diametrically opposite each other with reference to the axis of said shell.

13. The assembly of claim 11, wherein said second cylinder and piston units jointly constitute a double-acting cylinder and piston unit.

14. The assembly of claim 13, wherein said double-acting unit has a double-acting piston constituted by said second pistons and a single piston rod extending axially beyond both ends of said double-acting piston.

15. The assembly of claim 1, wherein said adjusting means further comprises means for maintaining the pressure of fluid in said circuit above atmospheric pressure.

16. The assembly of claim 15, wherein said pressure maintaining means comprises a source of pressurized fluid, a pressure regulating device connected with said source and a check valve connected between said device and said circuit to permit admission of pressurized fluid from said source into said circuit by way of said device.

17. The assembly of claim 1, wherein said monitoring means comprises two first cylinder and piston units which are disposed substantially diametrically opposite each other with reference to the axis of said shell, said adjusting means comprising a second cylinder and piston unit for each of said first units and a discrete fluid-containing circuit for each of said second units, each of said circuits connecting one of said second units with one of said first units and said adjusting means further comprising means for maintaining the pressure of fluid in said circuits above atmospheric pressure, said pressure maintaining means comprising a source of pressurized fluid, at least one pressure regulating device connected with said source and a discrete check valve connected between said at least one device and each of said circuits to permit admission of pressurized fluid from said source into the respective circuit by way of said at least one device.

18. The assembly of claim 1, further comprising means for compensating for the weight of said support, said weight compensating means comprising at least one additional cylinder and piston unit.

19. The assembly of claim 18, wherein said support includes an annular member which surrounds said carrier at one axial end of said shell and has an internal surface, said additional cylinder and piston unit including a third piston which acts upon said internal surface.

20. The assembly of claim 19, wherein said additional cylinder and piston unit comprises a cylinder for said third piston, said cylinder of said additional unit being provided in said carrier.

21. The assembly of claim 18, wherein said additional unit comprises a cylinder and a piston reciprocably extending into said cylinder, said compensating means further comprising a source of pressurized fluid and a pressure regulating device connecting said source with said cylinder.

22. The assembly of claim 21, wherein said compensating means further comprises an accumulator which is connected with said cylinder.

23. The assembly of claim 1, wherein said shell is deformable and further comprising means for deforming said shell, said deforming means comprising a further cylinder and piston unit having a further piston coaxial and rigid with said first piston, said first unit having a first cylinder for said first piston and said further unit having a further cylinder for said further piston, said first piston having a first diameter and said further piston having a different further diameter, said circuit communicating with said first cylinder and said deforming means comprising means for supplying to said further cylinder a pressurized fluid at variable pressure.

24. The assembly of claim 1, wherein said second unit comprises a cylinder receiving said second piston and communicating with said circuit, and further comprising means for compensating for the weight of said support including a third piston coaxial and rigid with said second piston, a cylinder for said third piston, a source of pressurized fluid and a fluid pressure regulating device connecting said source with the cylinder for said third piston, said second and third pistons having different diameters.

* * * * *